US008839234B1

(12) United States Patent
Voronkov et al.

(10) Patent No.: US 8,839,234 B1
(45) Date of Patent: Sep. 16, 2014

(54) SYSTEM AND METHOD FOR AUTOMATED CONFIGURATION OF SOFTWARE INSTALLATION PACKAGE

(71) Applicant: Kaspersky Lab ZAO, Moscow (RU)

(72) Inventors: Konstantin P. Voronkov, Moscow (RU); Stepan N. Deshevykh, Moscow (RU); Victor V. Yablokov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/851,811

(22) Filed: Mar. 27, 2013

(51) Int. Cl.
G06F 9/445 (2006.01)

(52) U.S. Cl.
USPC ............................ 717/176; 717/172; 717/174

(58) Field of Classification Search
USPC .......................... 717/172–177; 709/203–204
IPC ................................ G06F 8/60,8/61, 8/65, 8/70
See application file for complete search history.

(56) References Cited

U.S. PATENT DOCUMENTS

| 6,070,244 | A | 5/2000 | Orchier et al. | |
|---|---|---|---|---|
| 6,266,811 | B1 | 7/2001 | Nabahi | |
| 6,282,711 | B1 | 8/2001 | Halpern et al. | |
| 6,606,744 | B1 * | 8/2003 | Mikurak | 717/174 |
| 6,675,382 | B1 * | 1/2004 | Foster | 717/177 |
| 6,681,266 | B2 | 1/2004 | Ayyagari | |
| 6,725,453 | B1 * | 4/2004 | Lucas et al. | 717/178 |
| 6,760,761 | B1 | 7/2004 | Sciacca | |
| 7,047,529 | B2 * | 5/2006 | Delo | 717/174 |
| 7,246,351 | B2 * | 7/2007 | Bloch et al. | 717/175 |
| 7,313,792 | B2 * | 12/2007 | Buban et al. | 717/170 |
| 7,478,416 | B2 | 1/2009 | Edson | |
| 7,506,338 | B2 * | 3/2009 | Alpern et al. | 717/177 |
| 7,516,480 | B2 | 4/2009 | Pearson et al. | |
| 7,536,686 | B2 * | 5/2009 | Tan et al. | 717/174 |
| 7,571,207 | B2 * | 8/2009 | Yoshizawa et al. | 709/203 |
| 7,596,620 | B1 | 9/2009 | Colton et al. | |
| 7,730,480 | B2 | 6/2010 | Isaacson | |
| 7,730,482 | B2 | 6/2010 | Illowsky et al. | |
| 7,735,063 | B2 | 6/2010 | Herzog et al. | |

(Continued)

FOREIGN PATENT DOCUMENTS

EP 2180758 4/2010

OTHER PUBLICATIONS

Tyndall, "Building an Effective Software Deployment Process", ACM, pp. 109-114, 2012.*

(Continued)

Primary Examiner — Anil Khatri
(74) Attorney, Agent, or Firm — Patterson Thuente Pedersen, P.A.

(57) ABSTRACT

Automated configuration of a software application to be installed via a software installation package onto different user devices for different users. An initial software installation package is obtained, as is information representing (a) associations between the plurality of users and the plurality of user devices, and (b) user attributes from which access privilege level information for individual users is determinable. The initial software installation package is configured for the user devices based on the information representing (a) and (b), to produce a plurality of different specially-configured software installation packages, each one of which corresponds to one or more specific users and one or more specific user devices. Each specially-configured package includes parameters that establish functionality for the software application based on the access privilege level of the users. Each user is authenticated, and completion of installation of the software application is conditioned on a result of the authentication.

17 Claims, 5 Drawing Sheets

(56) References Cited

U.S. PATENT DOCUMENTS

| | | |
|---|---|---|
| 7,805,495 B2 | 9/2010 | Marmaros |
| 7,823,147 B2 * | 10/2010 | Moshir et al. ................ 717/173 |
| 7,831,734 B2 | 11/2010 | Bernhard et al. |
| 7,877,804 B2 | 1/2011 | Khanolkar et al. |
| 7,890,925 B1 | 2/2011 | Wyatt et al. |
| 7,912,929 B2 | 3/2011 | Styles |
| 7,945,906 B2 | 5/2011 | Bourke-Dunphy et al. |
| 7,945,955 B2 | 5/2011 | Katkar |
| 7,996,610 B2 | 8/2011 | Wan et al. |
| 8,006,241 B2 * | 8/2011 | Dias ............................ 717/174 |
| 8,015,559 B2 * | 9/2011 | Nakano et al. ................ 717/173 |
| 8,074,214 B2 | 12/2011 | Isaacson et al. |
| 8,086,582 B1 | 12/2011 | Wills et al. |
| 8,117,317 B2 | 2/2012 | Klimentiev et al. |
| 8,181,253 B1 | 5/2012 | Zaitsev et al. |
| 8,230,415 B1 * | 7/2012 | Thomas ....................... 717/173 |
| 8,316,357 B2 | 11/2012 | Mosier et al. |
| 8,332,464 B2 * | 12/2012 | Dispensa et al. ............. 709/203 |
| 8,392,911 B2 * | 3/2013 | Delahunty et al. ............ 717/176 |
| 8,407,682 B2 * | 3/2013 | Reisman ...................... 717/168 |
| 8,418,168 B2 * | 4/2013 | Tyhurst et al. ................ 717/173 |
| 8,464,249 B1 * | 6/2013 | Goldman et al. ............. 717/176 |
| 8,473,598 B1 | 6/2013 | Piper |
| 8,635,609 B2 * | 1/2014 | Deblaquiere et al. ......... 717/173 |
| 2003/0018964 A1 | 1/2003 | Fox et al. |
| 2003/0208569 A1 | 11/2003 | O'Brien et al. |
| 2005/0160420 A1 | 7/2005 | Kruta et al. |
| 2006/0173979 A1 | 8/2006 | Roellgen |
| 2006/0217133 A1 | 9/2006 | Christenson et al. |
| 2007/0198664 A1 | 8/2007 | Satkunanathan et al. |
| 2007/0223917 A1 | 9/2007 | Nagamine |
| 2007/0283344 A1 | 12/2007 | Apte et al. |
| 2008/0034200 A1 | 2/2008 | Polcha et al. |
| 2008/0147452 A1 | 6/2008 | Renz et al. |
| 2008/0183848 A1 | 7/2008 | Zilbershtein et al. |
| 2008/0244557 A1 | 10/2008 | Yeung et al. |
| 2008/0276295 A1 | 11/2008 | Nair |
| 2008/0289018 A1 | 11/2008 | Kawaguchi |
| 2009/0068980 A1 | 3/2009 | Creswell et al. |
| 2009/0094462 A1 | 4/2009 | Madduri |
| 2009/0094670 A1 | 4/2009 | Park |
| 2009/0320019 A1 | 12/2009 | Ellington et al. |
| 2010/0050172 A1 | 2/2010 | Ferris |
| 2010/0169497 A1 | 7/2010 | Klimentiev et al. |
| 2010/0228836 A1 | 9/2010 | Lehtovirta et al. |
| 2011/0022653 A1 | 1/2011 | Werth et al. |
| 2011/0035287 A1 | 2/2011 | Fox |
| 2011/0179151 A1 | 7/2011 | Sedukhin et al. |
| 2011/0214116 A1 | 9/2011 | Vidal |
| 2011/0289585 A1 | 11/2011 | Zaitsev et al. |
| 2012/0036245 A1 | 2/2012 | Dare et al. |
| 2012/0072882 A1 | 3/2012 | Hoff |
| 2012/0150796 A1 | 6/2012 | Martick |
| 2012/0185933 A1 | 7/2012 | Belk et al. |
| 2012/0216294 A1 | 8/2012 | Hahn et al. |
| 2012/0284704 A1 | 11/2012 | Friedman et al. |
| 2012/0297041 A1 | 11/2012 | Momchilov |
| 2012/0311144 A1 | 12/2012 | Akelbein et al. |
| 2013/0061218 A1 | 3/2013 | Moore et al. |
| 2013/0067461 A1 | 3/2013 | Taragin et al. |
| 2013/0125208 A1 | 5/2013 | Doukhvalov et al. |
| 2013/0159476 A1 | 6/2013 | Hilburn et al. |

OTHER PUBLICATIONS

Dolstra et al, "Imposing a Memory Management Discipline on Software Deployment", IEEE, pp. 1-10, 2004.*

Manna, "Dynamic Software Update for Component-based Distributed Systems" ACM, pp. 1-8, 2011.*

Pukall et al, "JavAdaptor: Unrestricted Dynamic Software Updates for Java" ACM, pp. 989-991, 2011.*

Creating Software Installation Packages with SMS Installer., Microsoft System Center. Jan. 15, 2013. http://technet.microsoft.com/en-us/library/cc180641.aspx.

Window Installer (Windows) as accessed on Mar. 27, 2013. http://msdn.microsoft.com/en-us/library/cc185688(v=vs.85).aspx.

ComUnity: Welcomes You: Extend and Operate your business model by delivering rich application services to all mass-market mobile devices as accessed on Jun. 26, 2013. 2 pages. http://www.comunity.co.za/index.php.

Push Notifications for Windows Phone dated May 31, 2013, accessed on Jun. 26, 2013. 2 pages. http://msdn.microsoft.com/en-us/library/windowsphone/develop/ff402558(v=vs.105).aspx.

Android Cloud to Device Messaging Framework as accessed on Jun. 26, 2013. 9 pages. https://developers.google.com/android/c2dm/.

About Local Notifications and Push Notifications as accessed on Jun. 26, 2013. 5 pages. http://developter.apple.com/library/ios/#documentation/NetworkingInternet/Conceptual/RemoteNotificationsPG/Introduction.html.

Oberheide et al, "Virtualized in-cloud services for mobile devices" Proceedings of the 1st workshop on virtualization in Mobile Computing. ACM. 2008 pp. 31-35.

Application and File History for U.S. Appl. No. 13/851,791, filed Mar. 27, 2013, inventor Voronkov et al., as available on PRIVATE PAIR at www.uspto.gov.

Application and File History for U.S. Appl. No. 13/928,125, filed Jun. 26, 2013, inventors Merkulov et al., as available on PRIVATE PAIR at www.uspto.gov.

* cited by examiner

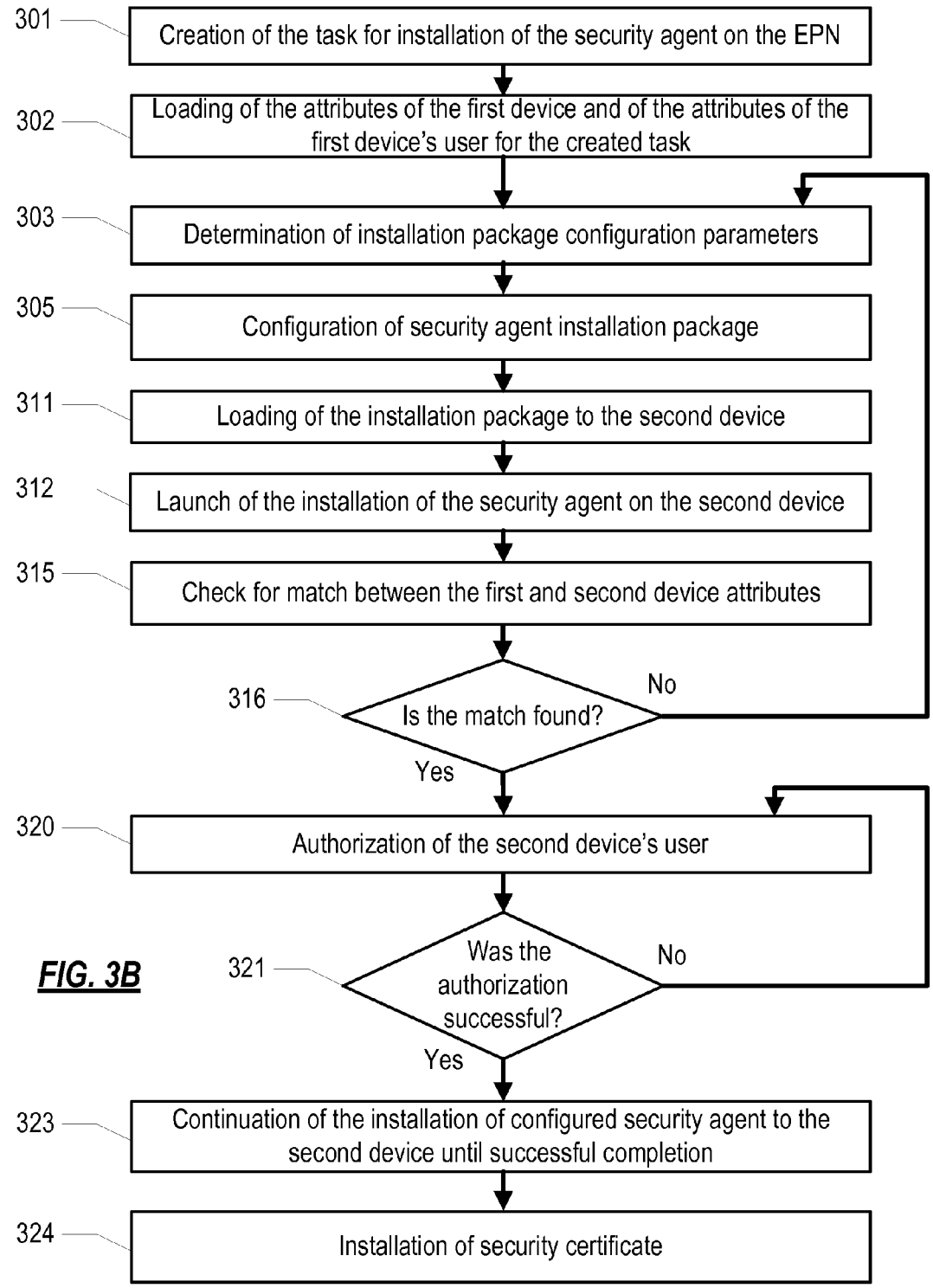

SYSTEM AND METHOD FOR AUTOMATED CONFIGURATION OF SOFTWARE INSTALLATION PACKAGE

PRIOR APPLICATION

This application claims priority to Russian Federation Patent Application No. 2012156447 filed Dec. 25, 2012, incorporated by reference herein.

FIELD OF THE INVENTION

The invention relates generally to information processing and communications technologies and, more particularly, to automated configuration of a software application to be installed via a software installation package.

BACKGROUND OF THE INVENTION

When managing computer network security, network administrators often face the difficulty of setting up the security software being installed on various devices. Solving this problem becomes especially important when deploying software (for example, an antivirus or access control systems) at large companies or in local area networks where the configurations of the devices connected to the network are significantly different from one another.

Another factor complicating the installation process of new software is the diversity of the user groups who have different access rights to the resources of an enterprise private network (EPN). The distributed infrastructure of EPNs often involves the use of various security policies, depending on the device, the network segment, and the user. It is impossible to consider all the above factors when installing software on network devices using the existing technical solutions.

The ongoing development of computer equipment increases the complexity of not only infrastructure, but also of security applications. A typical user is unable to optimally configure a security application due to lack of expertise and to company policies that aim to increase the level of security.

In general, remote administration tools are used to manage remote work stations (e.g., user devices). This allows administrators to set up security tools after their installation on desktop or notebook computer systems or on corporate devices with an installed administration agent. However, administration agents cannot be installed on all computer systems. In today's world, there is a trend of increasing presence of personal devices that have no installed administration tools. Such devices include, for example, smartphones, tablet computers, netbooks and other portable devices, which the users utilize for work and oftentimes also for personal purposes. For secure operation on a enterprise private network, the installation of security tools and the subsequent setup of such tools must be performed on the user's side.

More generally, there is a need for an effective and efficient solution for automatically configuring software for installation on user devices that operate on a computer network subject to various security policies.

SUMMARY OF THE INVENTION

One aspect of the invention is directed to a system for automated configuration of a software application to be installed, via a software installation package provided over a computer network, onto a plurality of different user devices for a plurality of different users. The system includes set of instructions executable by computing hardware and stored in a non-transitory storage medium that, when executed, cause the computing hardware to implement the following modules. A task manager module is implemented that obtains an initial software installation package, and communicates with a network attributes data store via the computer network to obtain information representing (a) associations between the plurality of users and the plurality of user devices, and (b) user attributes from which access privilege level information for individual users is determinable.

A configurator module is implemented that custom-configures the initial software installation package for individual ones of the plurality of user devices based on the information representing (a) and (b), to produce a plurality of different specially-configured software installation packages, each one of which corresponds to one or more specific users and one or more specific user devices. Each specially-configured software installation package includes installation parameters that establish functionality for the software application based on the access privilege level of the corresponding one or more specific users.

An authorization module is implemented that performs authentication of each user of each user device, and which either permits or prevents completion of installation of the software application on each user device via corresponding specially-configured software installation packages in response to a corresponding result of the authentication.

The software application can be a security application user agent in certain embodiments.

In other embodiments, the software application can be a variety of other types of applications. In related embodiments, the functionality for the software application based on the access privilege level of the corresponding one or more specific users includes a capability to provide certain access credential information, and configuration of the installation of the software application controls whether, and what, access credential information is permitted to be utilized.

The task manager module can be further adapted to obtain information representing device attributes for each of the plurality of user devices, and the configurator module can be adapted (e.g., programmed) to produce each specially-configured software installation package such that the installation parameters establish functionality based further on device attributes corresponding to the one or more user devices.

In a related embodiment, the authorization module performs verification of attributes of each user device on which the software application is being installed against a set of device attributes according to which each specially-configured software installation package is produced, and based on a result of the verification, installation of the software application is either permitted or prevented.

In other related embodiments, the task manager module is adapted to obtain information representing a security policy, and the configurator module is adapted to produce each specially-configured software installation package such that the installation parameters establish functionality based further on that security policy.

The configurator module can apply a set of expert rules to produce each specially-configured software installation package. The set of expert rules define various software installation package parameter settings according to various characteristics of the security policy.

In another aspect of the invention, a method for automated configuration of a software application to be installed via a software installation package is provided. In the method, an initial software installation package is obtained. Also obtained is information representing (a) associations between the plurality of users and the plurality of user devices, and (b) user attributes from which access privilege level information for individual users is determinable. The initial software installation package is configured for individual ones of the plurality of user devices based on the information representing (a) and (b), to produce a plurality of different specially-configured software installation packages, each one of which corresponds to one or more specific users and one or more specific user devices. Each specially-configured software installation package includes installation parameters that establish functionality for the software application based on the access privilege level of the corresponding one or more specific users. The method further includes authenticating each user of each user device, including either permitting or preventing completion of installation of the software application on each user device via corresponding specially-configured software installation packages in response to a corresponding result of the authenticating.

In a method that is carried out on a user device according to another aspect of the invention, the user device downloads a first specially-configured software installation package that is produced remotely by a service that: obtains an initial software installation package, obtains information representing (a) associations between a plurality of users and a plurality of user devices, and (b) user attributes from which access privilege level information for individual users is determinable, and configures the initial software installation package for individual ones of the plurality of user devices based on the information representing (a) and (b), to produce a plurality of different specially-configured software installation packages, including the first specially-configured software installation package, each one of the plurality of different specially-configured software installation packages corresponding to one or more specific users and one or more specific user devices, wherein each specially-configured software installation package includes installation parameters that establish functionality for the software application based on the access privilege level of the corresponding one or more specific users. The method further includes authenticating, by the user device, the user of the user device, including either permitting or preventing completion of installation of the software application on the user device via the first specially-configured software installation package in response to a result of the authenticating.

BRIEF DESCRIPTION OF THE DRAWINGS

The invention may be more completely understood in consideration of the following detailed description of various embodiments of the invention in connection with the accompanying drawings, in which:

FIG. 3B is a more detailed flow diagram according to a related embodiment.

Figure 1:
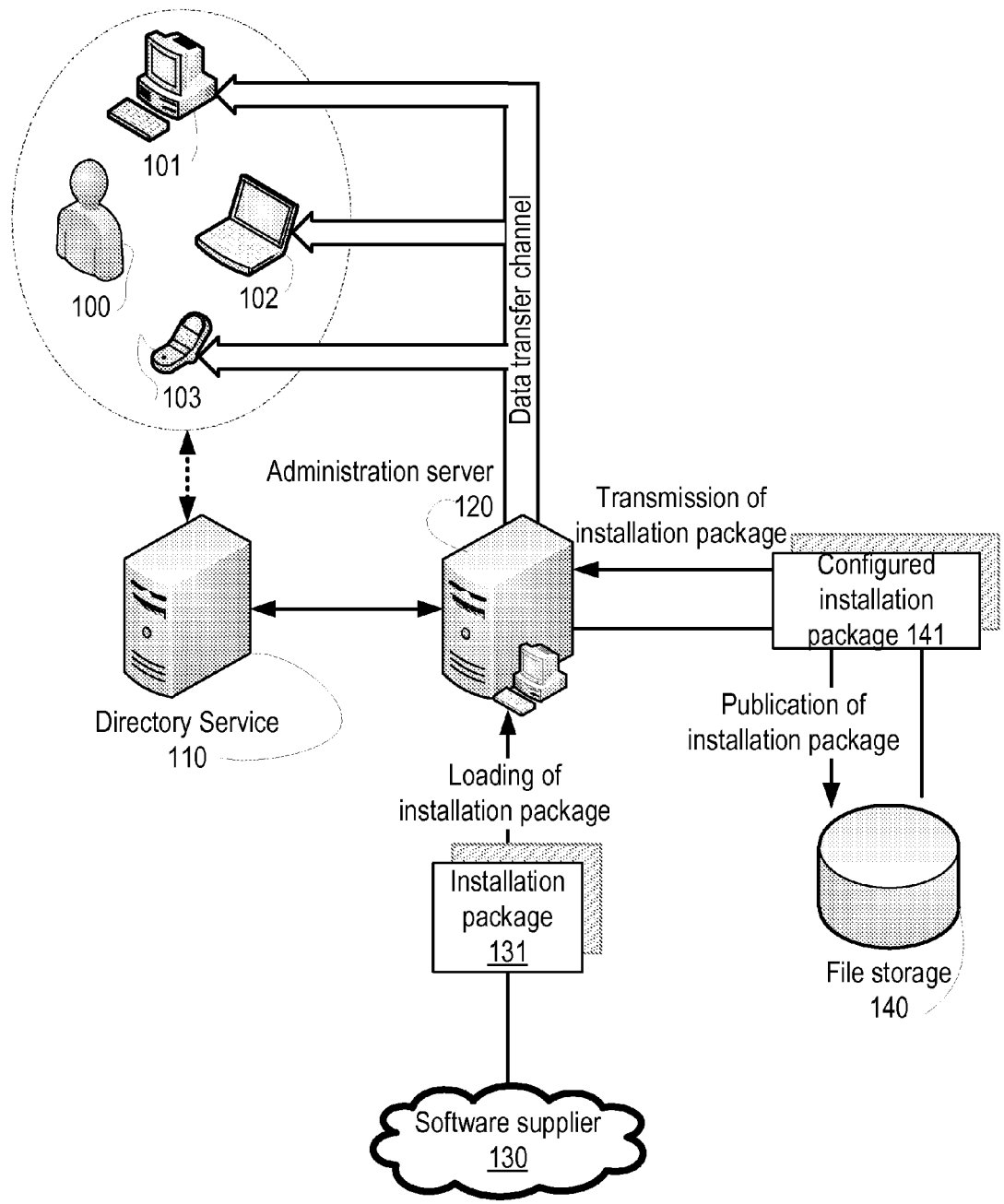
FIG. 1 is a block diagram illustrating a high-level system architecture for an automated software deployment system according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Practical applications of certain embodiments of the invention facilitate configuring of software installation packages, including the setup of access rights to device and corporate network resources, and the installation of the software to network devices in accordance with those access rights, and avoiding the possibility of unauthorized use of the configured software or unauthorized access to confidential information.

According to one embodiment, a system for purpose-specific installation of configured software is provided. In an example, one such system includes a task manager module and an installation manager module installed on an administration server and on a user device, respectively.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers (e.g., cluster nodes) that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

In this case, the operation of such a system includes the following functionality: a) from the computer network attributes data store, attributes of such objects are loaded which match the user's account and correspond to the user-controlled device on which it is planned to install the software; b) the software installation package is configured, determining the configuration parameters by the loaded attributes in accordance with the security policy set for that user and for that device; c) the configured software installation package is loaded in a device which may differ from the above-mentioned device; d) the loaded software is installed on the user-controlled device; also, it is checked whether the device on which the installation is being performed matches the device on which the installation was planned, and the installation is continued if such match was found; authorization is performed for the user controlling the second device, and the installation is continued if the authorization was successful.

Related embodiments facilitate the installation of software to a user's mobile device. In those embodiments where the software represents a security agent, the installation package configuration parameters include the following parameters: setup parameters for the protection components of the security agent; parameters of the installation of the security agent on the user device; parameters of the network connection with the administration server; parameters for inclusion of the protection component into the security agent; parameters for adding a security certificate.

The installation package configuration parameters in a particular embodiment are determined by the user's and the device's attributes, which include: the user's role in the company; the user device's configuration; the parameters of the network connection with the administration server; a list of accessible network resources; the user's workplace. In a related embodiment, the attributes are loaded from a directory service.

The installation package can contain a configuration file, an installation file, and a security certificate, for example.

In another related embodiment, when the installation package is loaded to the user device and launched, a verification is performed. Before, during or after the installation of the software on the user-controlled device, user authorization and device match verification are each performed. The devices are considered to be matching if the configuration parameters of the device for which the installation was planned match the configuration parameters of the device on which the installation is actually being performed. In another embodiment, the devices are considered as matching if the configuration parameters of the device on which the installation is being performed match the configuration parameters of the installation package. In case of unsatisfactory result of the verification or of the authorization, the user may be offered to pass another verification challenge and authorization stage, or to load a different configuration of the installation package.

In one embodiment, the configuration of installation packages includes settings which exercise user rights when operating the device within and outside an enterprise private network (EPN). In the present context an EPN is a computer network operated by an organization such as a company, educational institution, a governmental agency, a non-governmental organization, a non-profit organization, or the like, and is not limited to any particular network architecture, whether host-based, or content-based, etc. An EPN can connect to a public network such at the Internet, or to other private networks.

If a security agent configured for a specific employee or a group of employees is installed on a device controlled by a third party, this can be a violation of a company security policy, because the third party will gain access rights exceeding their authority. Thus, a related embodiment provides a solution to the problem related to unauthorized installation of configured software installation packages, by authorizing the user and by comparing a device's configuration with the software configuration parameters or with the software installation package parameters. As an example implementation, a method is described for configuring and installing security agents in the process of deploying a security system on an EPN. Principles of this type of embodiment can be similarly used for purpose-specific installation of other software besides security applications. For instance, productivity applications (e.g., word processing, spreadsheet, etc.), database applications, business system software, computer-aided design (CAD) applications, and the like.

In one approach, reliable EPN security is facilitated by a distributed system of security tools, each of which has a specific functionality and is installed on end devices of a network. When implementing security applications, such as an antivirus module, the diversity of the end computer devices to be protected, i.e. multiple software and hardware configurations, is taken into account.

The types of user devices on the network to be protected are not limited to desktop computers and servers installed by a company's system administrator; also included are personal user devices, on which unsafe software may be installed and which may represent a data leakage channel. Personal devices should preferably be protected and monitored when performing service operations, for example, when working with corporate resources (data, applications, network connections). The difficulty lies in the fact that such devices do not have remote administration and control tools. Therefore, the setup of security tools is performed by the user; this creates a number of difficulties for the technical support services and for the security service. A description of an option to solve this problem will be provided in this document.

The specification of an EPN, including network connection parameters, a list of network services, and the configuration of network devices, can be presented in a network attributes data store, such as, for example, a directory service. This type of data store can be implemented as a tree structure stored centrally or in distributed fashion on the EPN, and containing objects representing the various user devices and their attributes, which characterize the parameters of such devices. One example of a directory service is defined by the LDAP protocol and can be used by outside programs and services, including administration tools, for adaptive setup of security tools, taking into account the EPN specifications.

From the state of the art, other methods for presenting data on network resources and their connections are known; such methods are implemented, for example, in databases, XML files and other sources. Aspects of the invention are not limited to the integration of an administration server with a directory service. Thus, in the present context, the term network attributes data store refers to any suitable arrangement for storage and presentation of information about network users and devices.

An antivirus application is a ubiquitous element of EPN protection. Today's antivirus solutions include functionality going beyond mere verification of files for the presence of a malicious code. As used in the present context, an antivirus tool or module should be understood as referring to a multifunctional computer security application. Depending on the type of the antivirus application, the functional capabilities include computer system protection, information protection, control, and synchronization with other security tools. The architecture of an antivirus tool for an EPN can be complex and can include multiple modules installed on various EPN nodes. The modules installed on end devices of a network, including personal devices of EPN users, can vary and will be referred to herein as security agents.

A user of a device operating on the EPN is generally a company employee or authorized visitor registered on the network. In accordance with typical practice, at the time of hiring, an account is created for each employee; the account is used to store personal information, such as user name, birth date, position, and passwords, keys, or other access credentials necessary for the user to gain access to corporate resources. For company visitors, a separate profile is generally created, which limits their rights for access to network resources. In order to work on the computer network and to gain access to the network resources and applications, the user must pass an authentication. A directory service is perhaps the most common service for ensuring control over access and accounting of users and network resources. There are standards for structuring network objects on which the most popular directory service designs are based. Therefore, most computer networks in companies include a standard service containing necessary information about the users.

Depending on the network structure, directory service users can be divided into groups. A group is used to combine users by a certain characteristic and for inheritance of the group's specifics by all users belonging to the group. For example, a group can combine employees by offices, by the company's structural units, by the granted level of access to information, or by other characteristics. Each group, as well as each account, contains attributes which characterize connection parameters, rights of access to specific resources and applications of the network. Such structure of storage and safe presentation of data on the network objects, implemented in a directory service, allows to implement the security policy adopted at the company.

One of the criteria during the categorization of users is their position at the company and their access to valuable information presenting commercial or government secrets. Accordingly, the information security requirements for the company management are more strict than for the ordinary employees. The categorization of users can be performed dynamically, by adding a user to a group depending on the behavior, connections, personal characteristics and dynamics of the changes in the security rating of the user. A more detailed description of user categorization tools by the above-mentioned factors is provided in U.S. Pat. No. 8,181,253, the disclosure of which is incorporated by reference herein.

FIG. 1 is a block diagram illustrating a high-level system architecture for an automated software deployment system according to one embodiment. On a network composed of devices (servers, desktop computers 101, notebooks 102 and portable devices 103) and offering a number of services (mail service, web service, antivirus protection service and others) for the users 100, a directory service server 110 is often used to organize the management of such resources. This server contains a database for organized storage of the information about the network and allows to automate most management tasks, which include, for example, setting up applications and network connections and sharing access rights. The interaction with the directory service 110 is performed using a standard protocol. As one of the embodiments, a system will be discussed which interacts with an LDAP (Lightweight Directory Access Protocol)-compatible directory service 110.

When a system administrator or a security service specialist creates a task of deploying security agents or another application on network devices, one item to be loaded is the installation package 131 from a software supplier 130; the package is saved in the file storage 140. In the case of a security agent, the software is supplied by a company which develops the security tool, or by a software distributor. The installation packages and the installation files (if they are not included in the installation packages) used to install programs on user devices, including installers of security agents, are stored in the file storage 140. The files which are to be loaded to EPN devices are published. The publication generally involves providing an interface for the loading of the package and for the setup of the relevant access rights for the devices and the users. The file storage can include a file server, a directory on the administration server, a database, or any other data storage tool providing access to the files.

The network administrator performs all the actions on the administration console, which is a management terminal of the administration server 120. Once the installation package is loaded, the group of devices is determined on which the program is to be installed. The group of devices is specified during the creation of the task or is defined automatically. For example, a group of devices can be automatically defined by all devices connected to the network for the first time, or by all devices on which no security agent is installed, and can add them when creating the deployment task.

For each device or for each user of a device included in the device list or in the group task user list, the relevant classes and attributes from the directory service 110 are defined. These data are used to set the parameters for the security agent or for another application to be installed, using expert rules. For each device, a separate set of parameters is created, which is used in the configuration of the installation package for that device. The configured installation packages 141 are saved in the file storage, upon which hyperlinks are sent to network devices. The loading to the end devices can be performed through data transfer channels, which vary by their sharing environment, network parameters or pathways, data transfer protocols and applications. For example, the same file can be transferred using the Ethernet or Wi-Fi network, a TCP protocol or a UDP protocol. The choice of a data transfer channel and of its parameters can also be based on the directory service data and depends on the network infrastructure and on the device configuration.

Aspects of the invention are directed to processes for configuring and installing security agents and the systems constructed to be used to that end.

Figure 2:
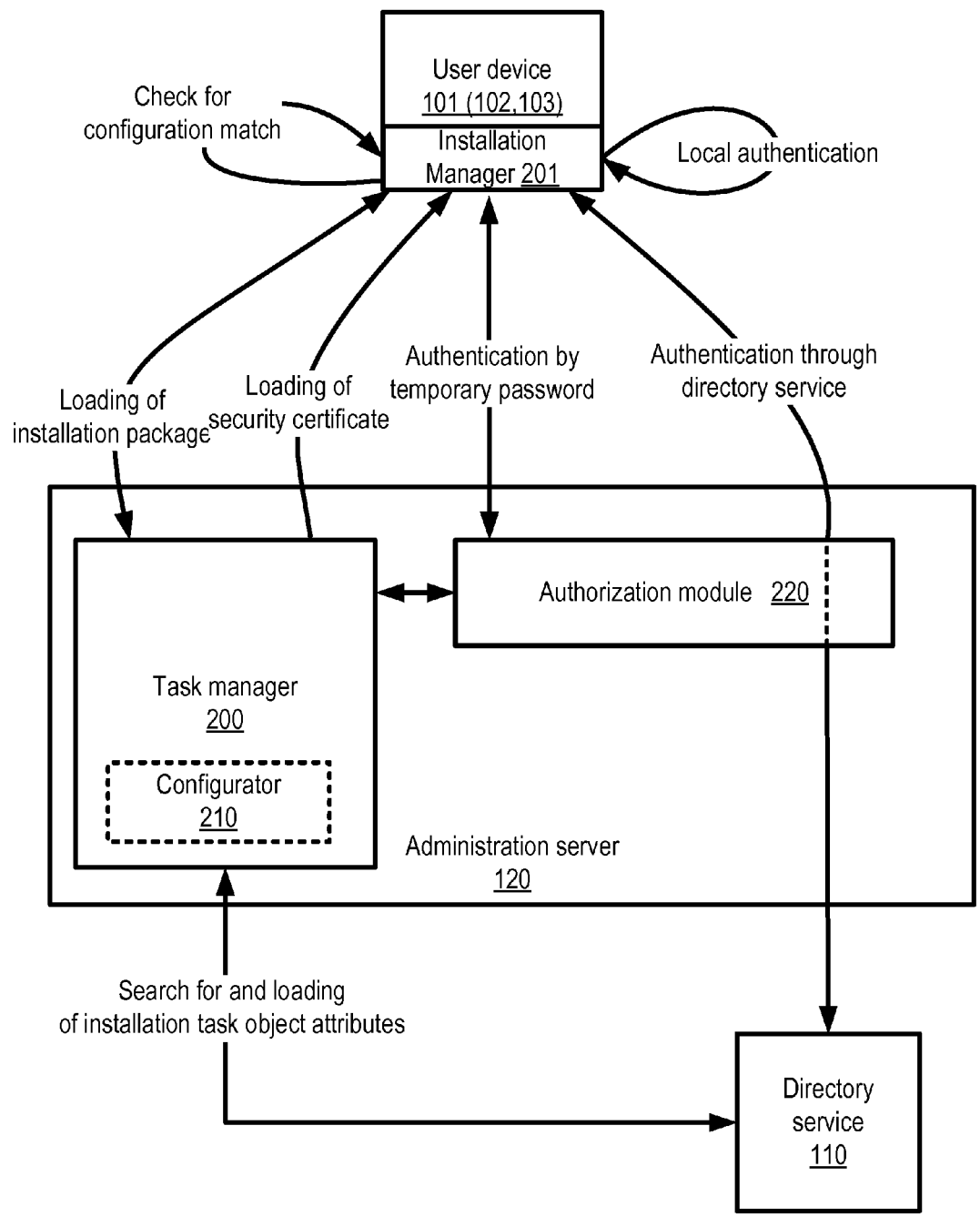
FIG. 2 is a diagram illustrating additional details of the system of FIG. 1 according to one embodiment.

FIG. 2 is a diagram illustrating additional details of the system of FIG. 1 according to one embodiment. The components of this system can be installed on a separate network server or implemented in the form of a virtual machine or as a service for an administration server. The description of the implementation of a task manager and of an authorization module as part of the administration server 120 and installation manager 201 as part of the user device does not limit the options of the system's implementation on other computer devices of the network. In this example, the system includes a task manager module 200, operatively coupled with, or including within its functionality and structure, a configurator module 210. An authorization module 220 can be part of the task manager or can be a separate module, as shown. Installation manager 201 can be implemented locally on the user device. As depicted in this example, the system is communicatively coupled with directory service 110.

In this example, administration server 120 is a tool for centralized management of an integrated security system, which grants the administrator access to detailed information about the corporate network's security level and facilitates flexible setup of all security system components. The administration server 120 manages the security agents which ensure the security of the end devices of the EPN.

In general, policies are tools for remotely administering the security-related parameters on user devices. Policies are used to set parameters related to the overall product, interface parameters and security component parameters. A policy is used both, to set up parameters and to monitor their utilization on computers. The parameters of a policy are sent to client computers as scheduled or in case of their change.

Administration work is planned through tasks, which include: an update task, a report-building task, a scanning task, a security agent installation task, and others. Tasks can be created for a device or a group of devices, depending on the established goals. The administration server allows to deploy a security system for a specified group of devices. The administrator can quickly configure and install security agents using installation packages.

The creation of a task includes several stages:
Selection of the task type (installation, update, security agent setup, etc.);
Setting of the task parameters;

Selection of the group of objects for the task being managed;

Setting up the execution schedule.

During the operation of the remote installation master or during the creation of an installation task in the task manager 200, the administrator defines the list of devices and/or groups of devices on which it is needed to install the security agents, and the version of the program being installed, to which a certain set of installation files correspond. The administrator can specify a list of users and/or groups of users in addition to, or instead of, a group of devices as the targets for installation. According to various embodiments, any attributes installed in the directory service and unique for the device may be used as device and user identifiers. A link to installation files (installation package), a name or any other application ID can be used as the installation package version ID, for example.

During the creation of an installation task, it is possible to choose target devices from a list. This list is built by the administration server through network scanning. The scanning is performed periodically using various known methods.

One method for scanning a network involves the administration server 120 gathering lists of network computers exactly in the same manner as it is performed by an operating system (e.g., Windows® by Microsoft Corporation). This scanning method is called fast network scanning Building and providing the computer list is the responsibility of the Computer Browser service. During a full network scan, the administration server 120 goes through the list obtained as a result of a fast scan, and attempts to connect to each computer using the NetBIOS protocol. The purpose of this poll is to identify the computers' IP addresses and operating systems. Another method for obtaining device lists is to use a directory service, for example, Active Directory. Scanning of networks is another option for obtaining a list of devices. This involves sending an echo request to all addresses of the specified ranges. Mobile device management (MDM) tools, an Exchange Active Sync protocol, or a special protocol of the administration server 120 can be used to obtain lists of mobile devices.

By default, the administration server 120 includes at least one group of computers. This setup forces the administrator to use a single protection policy for all computers. Even in small networks, it is generally convenient, and sometimes necessary, to use different protection settings for servers and user devices. In large networks, where different user groups use different specialized programs, the possibility to create policies with different exceptions for different users is quite convenient. In order to apply different policies, the devices can be assigned to different groups.

In large EPNs, administrators also create groups to organize the implementation process. For example, computers without a security agent or protection tools are put in the "Deployment" group, where a task of automatic security agent installation is created. Computers with an installed agent are put in the "Compatibility Check" group, where incompatible program removal tasks are created, etc. Finally, fully protected computers are moved into a permanent management structure.

The groups of users, devices and other network objects on the administration server and in the directory service can be synchronized, can complement each other, or can be unrelated. In the case where a group of devices selected during the creation of an installation task is not contained in a directory service in an obvious form, that group of devices can be viewed as multiple separate devices, each of which is represented in the directory service. A similar representation can be built for the users.

The administration server 120 can contain information on the connection between the users and the devices and can identify a user by a specified device or vice versa. Therefore, the policy and the tasks for the devices can be transmitted to the relevant user accounts. In the scope of this description, we will discuss examples of managing devices and device groups on an EPN, though this example should not be viewed as limit the possibilities of the system and method described herein, as the comparison of devices and users allows to implement the proposed solution to manage both a single user and a group of users.

The administration server 120 can download information on the distribution of groups and computers, as well as their parameters, from the directory service 110. This can also be performed in an automatic mode, which allows to synchronize data in the directory service 110 and on the server 120. Additionally, the administration server 120 can store information (for example, device check parameters or user security ratings) in the directory service 110, for which it is necessary to complement the structure of the directory service 110.

Below is an example of an installation package 131 used to install programs in operating systems of the Windows® family of operating systems. An installation package 131 is a file which has the extension .msi and contains all the information required for the installation. The processing of this type of file and the performance of the installation process is the responsibility of a special component of the operating system, Windows Installer (a Windows installation manager).

A .msi file is a compound document containing a database which stores various information on the product and the installation process. All string data are stored in a separate part of the document, while the database tables contain pointers to the relevant data. In addition to the database, the structure of an .msi file allows to complement the file with user scenarios, scripts, and supplementary dynamic libraries, if they are required for the installation. The files being installed can be part of the installation package 141, or can be stored separately in compressed or uncompressed form.

The installation process includes several stages:

gathering of information (determining the installation directory, the source of the installation files, the connection parameters, setting up the update parameters, etc.);

execution of the installation (copying files, making changes to the system registry);

going back to any installation stage, including cancellation of the installation (in case of error or exit from the installation program).

Each installation stage involves a sequence of actions (instructions) written in a database. Most actions are standard actions usual for a typical information gathering and installation process. The user can define a specialized set of actions. The user-defined actions can be either written in one of the script languages built in the operating system (JScript or VBScript), or located in a specially created library of functions (using C or C++ programming languages for a Windows family operating system (OS). A more detailed description of the format of installation packages and embodiments is provided in the MSDN documents library, hosted by Microsoft Corporation. Aspects of the invention are not limited to the use of this format of the installation packages 131 and can also support other formats, depending on the device's operating system, for example, RPM (Red Hat Package Manager) for the OC Linux family, and deb (Debian OC project).

The above-described possibilities, included as standard items in installation packages, allow to change (supplement) the issued versions of programs without changing the program code and without re-compiling the executable files.

In one embodiment, a special version of the installer is created by making changes to the installation package 131. An example of such a change can be supplementing the installation package's database with program parameters and instructions which allow to automatically apply the parameters to the program. This feature allows automating the installation process and to optimize the installation management process by reducing the number of operations to be executed and by reducing the number of the tasks created by the administrator.

Directory service 110 is a module for hierarchical representation of company resources and of the information about such resources. Resources can mean personnel, network resources, programs, etc. An example of implementation of a directory service is Active Directory, which is most often used for EPN administration. Active Directory has a hierarchical structure composed of objects. Objects are divided in three main categories—resources, services, and user and computer accounts. Active Directory provides information on objects, allows to organize objects, and manage access to them, and sets security rules. An object is uniquely defined by its name and has a set of attributes, i.e. characteristics and data it can contain; the latter, in turn, depend on the object type. In the scope of this application, storage of information on the users and their devices is a key feature of the directory service 110. Access to the directory service data is gained by requests, after which the directory service 110 performs a search and provides information. The main structure of the Active Directory has a number of classes storing information on users, for example:

"Organizational-Person"—a class providing information on the user's position in the company's structure (title, role, unit, office, room, etc.);

"User"—a class of network users which includes information on employees or visitors. It is a sub-class of the "Organizational-Person" class.

"Person"—a class which stores personal information on the user.

Various attributes are used to describe classes—for example, "Address", "Department", "Employee-ID", "E-mail-Address", "Title", and other parameters. The classes are also linked to each other by logical links, which allows to define a user's connection parameters or the set of the programs used for work. The user is also matched with his/her devices. To define them, several classes are also used, such as:

"Device"—the main class for storage of data on physical network devices;

"Computer"—an account class for a network computer.

To describe device classes, the following attributes are used: "Machine-Role", "Managed-By, Owner", "Network-Address", "Operating-System", "Proxy-Addresses", and others.

A created task is a data structure composed of parameters which can be viewed as IDs of devices, users, or applications. Using these IDs, the task manager 200 sends a request to the directory service, which results in an organized set of attributes that characterize each object of the task. The received attributes are interpreted into security parameter values. The interpretation rules are based on the security policy. Below are some examples of matches between user attributes and security agent parameters.

In one example, all human resource department users need remote access to the internal HR system, so if the installation task covers a device managed by a user from the HR (Human Resources) group, then a certificate and the settings for the access to the internal HR system will be added to the installation package 131. Therefore, an example of the configurator rule for this case in the form of the "if" clause will look as follows:

IF {department=HR} THEN {certificate=add}, where "department" is an attribute of the user's department, and "certificate" is a certificate addition parameter.

The security policy for company couriers takes into account their frequent travel, which increases the risk of infection of devices when connected to outside networks and the risk of loss of computer devices storing corporate data. For this group of employees, as well as for all the devices which are often connected in locations outside the office, the installation package 141 of the security agent must include an additional container with a safe browser and an agent setup, where the "GPS tracking" (tracking of coordinates) and the device locking function (if the device is inactive for a certain period of time) can be activated. This security policy requirement corresponds to the following configurator rule:

IF {title=courier OR location!=local}
THEN {safe_browser=add AND GPS=ON)}, where "safe_browser" is the parameter of addition of the protected browser component, and "GPS" is the parameter of the location tracking function activation.

Once one or all rules have functioned, the resulting parameters are used to configure the installation package 131. The configurator module 210 can be implemented by a set of functions called depending on the input parameters. For the above examples, the configurator can include a certificate addition function, a component addition function, and a settings change function. The setup of an application can be performed using scripts (processed by the installation manager) executed during the launch of the installation package. Another approach for applying settings is to modify application resources (configuration files, executable files, resource files, registry keys, etc.). The installation package can contain not only modified installation files, but also can be expanded and can include additional programs, libraries, resource files or updates, which will be installed and applied during the security agent installation. Then, the configured installation package is saved by the task manager or directly by the configurator in the file storage.

The configured installation package 141 of the security agent includes instructions or configuration files, which allow the system to set up software components for specific user roles and for specific user devices, including the setup of the access control components. After the installation of the configured package 141, a security agent already set up in accordance with the security policy will function on the user device. One of the options for user authorization when accessing network resources while working with applications and data can be represented by a security certificate, which is included in the installation package or loaded during installation from a network resource.

The installation package 141 configured in this manner, when run on a user-owned device different from the one whose attributes were used to configure the installation package, will result in the installation of software with another user's rights. This can result in unauthorized use of software and subsequent unlicensed use of provided services and programs, leakage of corporate data, identity falsification, etc.

To address this problem, in one embodiment, unauthorized installation of configured software, namely a security agent, is prevented by adding code to establish an authenticity check module to the installation package or to the installation file.

The authenticity check module can also be established by the operating system. Once established, the authenticity check module checks the possibility for the execution of an action for the user on the device where the action is being performed.

In one embodiment, where the authenticity check module is established using a script and/or program included in the installation package, it is executed during the launch of the installation. The installation packages are processed by the installation manager 201, which is a component of the operating system, or by a special service operating on the device. A verification of a match between the configured security agent and the user device will be performed during the operation of the security agent. From the security point of view, it is preferably to perform the authenticity check before the execution of the other functions.

The authenticity check process in the present context means a check of the match between the configuration of the installation package and the device on which the package is processed, as well as the match between the installation package configuration and the user controlling the device. The processing of the installation package can include saving, loading, launch, copying, transfer and other operations.

In today's personal devices, including smartphones, there can be a possibility of sharing and multiple user operation. Multiple users can operate the same device, or multiple accounts can be set up for one user—for example, for office work and home work. In a related embodiment, to accommodate the possibility of a multi-user device, a user operating such a device must pass authentication, upon which his/her personal data and environment settings will be loaded, and he/she will be granted access rights.

Authentication of the user operating the device is one of the options for checking the match between the user and the software (security agent) configuration parameters. In this case, the authorization includes authentication and comparison of the attributes of the user who has passed the authentication with the attributes of the user which were utilized to obtain the installation package through the configurator. Access rights to a specific version of the installation package can also be set for each user or group of users.

A user authentication and authorization service in a directory service can be an example of a user authentication implementation. Discussed below is the rights sharing process implemented in the Windows® family of operating systems. In order to log into the system under a user account, including the administrator account, the user must pass authentication in the directory service. To do this, he/she enters the login and password and/or connects a security token. In case if the entered data are valid and match the security policy (the password has not expired), the user is granted access to the device. In this case, for each file, access rights are set which include a list of users and a set of actions corresponding to each user which are allowed or restricted when working with the file. Therefore, the authorization of a user for the installation of a configured package in one of the embodiments consists in checking the match between the rights specified in the installation package and the rights granted to the user. If the launch and/or the opening of the installation package for the user is allowed, the installation will be continued; otherwise the installation will be cancelled.

The authentication and/or authorization of a user can be performed using the authorization module 220 installed on the administration server or realized in the form of a separate EPN server. In one embodiment, the authorization module 220 is integrated with the directory service and can synchronize user authorization data for verification of identifiers. The authorization module 220 can have its own database of user IDs and can perform authentication and authorization pursuant to a special protocol, using various cryptographic algorithms and the security policy.

The call for the authentication window and/or the interaction with the authorization module 220 is performed by the installation manager 201, if the authenticity check module is established by code that is part of the installation package, or directly by the security agent, if the authenticity check module is installed and executed on the device together with other installation files of the application. Then, the user enters access credentials, which are checked in the authorization module 220. The installation and operation of the agent in full access mode continues only in case if the authorization was successful, i.e., the access credentials provided by the user (or the data read from a token) are identical to the data stored in the authorization module 220. IN a related embodiment, a further check is made to confirm that the installation package configuration or the security agent configuration matches the correct user (the user has rights for operations with the installation package). Otherwise, the application being installed stops working or enters into a restricted access mode—for example, it resets all settings, blocks access to encrypted and confidential data, disables security certificates, functions in a background mode (is loaded but does not perform any actions). A user match check can be performed by comparing the user's attributes and the configuration parameters following the rules used for the configuration of installation packages.

A user authorization may be insufficient for the compliance with the security policy during the installation and the utilization of a security agent or another software configured for the specific user and device. If a user is attempting to install a program on a device different from the one for which the program was intended, this can result in an error in the device and program operation and in unsafe work with data. Therefore, in a related embodiment, the authenticity check also includes a process of verification of the match between the first and the second device. The first device is the device for which the security agent or the security agent's installation package was configured; the second device is the device on which the security agent is being installed or run. The match check can represent a comparison of IDs, for example, computer names on a network, serial numbers, physical addresses, etc., or by a combination of factors. The comparison can be performed by sets of attributes matching each of the devices. If the attribute values for two devices are identical within the allowed standard limits, the devices are considered to be matching.

Accordingly, in this embodiment, the operation of the installation manager 201 continues after successful user and device checks. The above-described embodiments for checking the match of a configured installation package 141, a device and a user do not limit the application scope of this invention, where the authenticity check can be implemented using any other known methods.

Figure 3A:
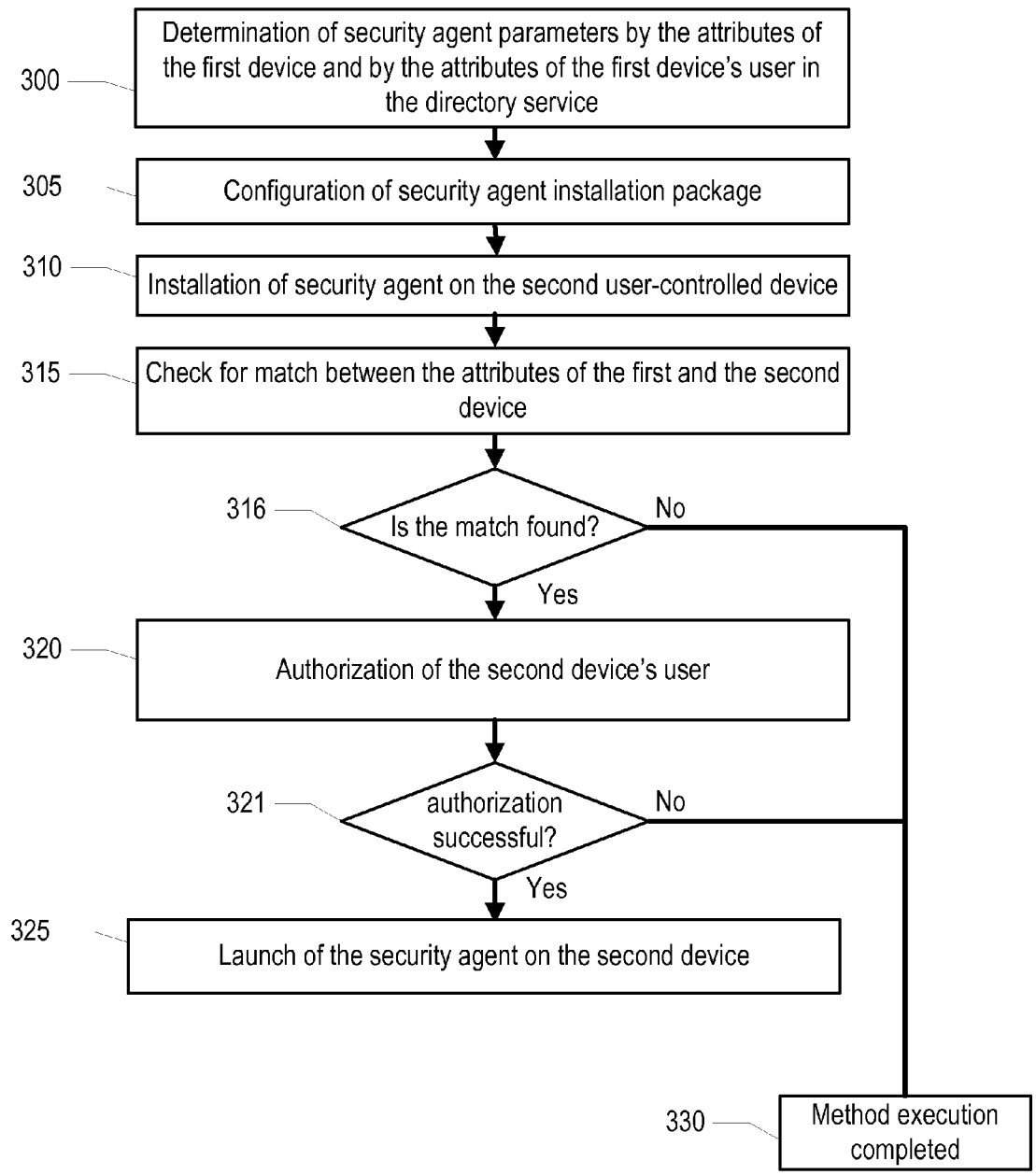
FIG. 3A is a flow diagram illustrating an exemplary process of operation of the system of FIGS. 1 and 2 according to one embodiment.

FIG. 3A is a flow diagram illustrating an operation algorithm of a method for purpose-specific installation of configured software, using an example of a security agent according to one embodiment. The execution of the method begins with determining the security agent's parameters by the attributes of the first device and of the user of the first device at 300. As a minimum, the device specified in the installation task created in the task manager determines the set of attributes for the configuration of the installation package. The attributes of the network devices, users, services, as well as their logical links, are represented in the network attributes data store. A directory service 110 is one example of the implementation of such a tool. The determination of the installation package parameters and, indirectly, of the security agent parameters, is performed by processing the attributes received from the directory service, for example, using the expert rules described above. Configuration of the installation package is performed at 305, using the received parameters: the installation package database is filled out; if required, security modules, necessary program libraries and installation files are added. The installation of the security agent on the second device begins at 310. The second device, just as the user who controls the second device, can have rights and attributes which do not allow to install the installation package configured at 305. Therefore, after the launch of the installation package, a check for a match between the first and second device 315 is performed, and if the match is found at 316, user authorization is performed at 320. The successful authorization condition is checked at 321.

In various embodiments, the checks for a match between the devices and the user authorization can occur simultaneously, or in reverse order. If two checks are successfully passed, the operation of the security agent on the second device under the management of the authorized user will be continued. Blocks 315, 316, 320, 321 can be performed and repeated not only after the launch of the installation, but also during the launch of the security agent, in case of change in the device configuration, in case of change or exit from the account, and at other conditions. If a check at 316 or 321 finds a mismatch, the process terminates, and the operation of the security agent, including its installation, stops.

One method for purpose-specific installation of security agents is shown in more detail in FIG. 3B according to a related embodiment. Block 300 in FIG. 3A is divided into three stages, 301-303, during which the task of security agent installation in the EPN is created at 301, the attributes of the created task's objects are loaded from the directory service at 302, and the configuration parameters of the installation package are determined at 303 using the loaded data. After the configuration of the installation package using the parameters determined at 303, the installation package is loaded to the device at 311, and the installation of the security agent is launched on that device at 312. These two stages correspond to block 310 in FIG. 3A, where the agent is installed on the second user-controlled device. This is followed by a check of the conditions for the match between the second device and the first one, and of the user rights of the second device, in the same manner as described in connection with FIG. 3A.

This process describes an embodiment where the check is performed during the installation of the security agent; therefore, upon successful authorization, the installation of the configured security agent to the second device continues at 323.

In case if the access rights to the network resources are provided through a security certificate, which is included in the installation package configuration or loaded during installation, the final stage will involve the installation of a security certificate at 324. After that, the security agent is successfully installed and set up for operation on the EPN.

The user is automatically granted access to the information intended and allowed for him/her, while the device and the data processed on the device are protected in accordance with the user's role at the company and with the configuration of the device being used. This example also describes the check cycles 316, 321. For example, if the user has not passed the authorization, he/she is given the opportunity to log in under a different account or re-enter the identification data, and if the device does not match the agent's configuration, there is a possibility to configure a new installation package for the device or attempt to modify the device's configuration in order to meet the requirements.

Figure 4:
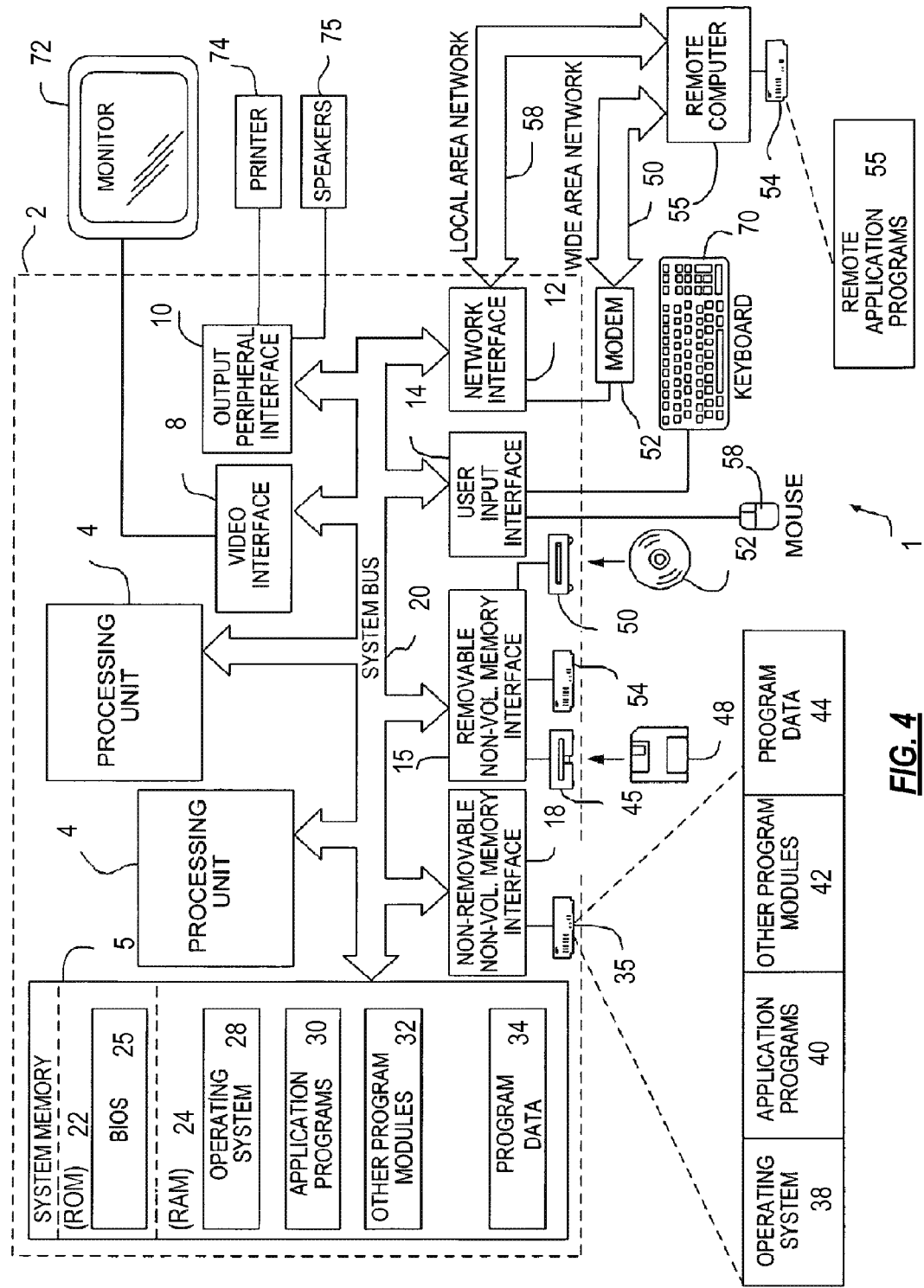
FIG. 4 is a block diagram illustrating an example of a general-purpose computer system on which aspects of the invention may be carried out.

FIG. 4 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are within the spirit of the invention. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for automated configuration of a software application to be installed, via a software installation package provided over a computer network, onto a plurality of different user devices for a plurality of different users, the system comprising:
    set of instructions executable by computing hardware and stored in a non-transitory storage medium that, when executed, cause the computing hardware to implement:
    a task manager module that obtains an initial software installation package, and communicates with a network attributes data store via the computer network to obtain information representing (a) associations between the plurality of users and the plurality of user devices, and (b) user attributes from which access privilege level information for individual users is determinable;
    a configurator module that custom-configures the initial software installation package for individual ones of the plurality of user devices based on the information representing (a) and (b), to produce a plurality of different specially-configured software installation packages, each one of which corresponds to one or more specific users and one or more specific user devices, wherein each specially-configured software installation package includes installation parameters that establish functionality for the software application based on the access privilege level of the corresponding one or more specific users;
    an authorization module that performs authentication of each user of each user device in response to an initiation of installation of the software application via execution of a corresponding specially-configured software installation package on each corresponding user device, and which either permits or prevents completion of the installation of the software application on that user device in response to a corresponding result of the authentication, wherein the authentication of each user of each user device is a distinct authentication operation from a local authentication operation performed by each user device to authenticate an authorized user.

2. The system of claim 1, wherein the software application is a security application user agent.

3. The system of claim 1, wherein the functionality for the software application based on the access privilege level of the corresponding one or more specific users includes a capability to provide certain access credential information.

4. The system of claim 1, wherein the task manager module is adapted to obtain information representing device attributes for each of the plurality of user devices, and wherein the configurator module is adapted to produce each specially-configured software installation package such that the installation parameters establish functionality based further on device attributes corresponding to the one or more user devices.

5. The system of claim 4, wherein the authorization module performs verification of attributes of each user device on which the software application is being installed against a set of device attributes according to which each specially-configured software installation package is produced, and wherein based on a result of the verification installation of the software application is either permitted or prevented.

6. The system of claim 1, wherein the task manager module is adapted to obtain information representing a security policy, and wherein the configurator module is adapted to produce each specially-configured software installation package such that the installation parameters establish functionality based further on that security policy.

7. The system of claim 6, wherein the configurator module applies a set of expert rules to produce each specially-configured software installation package, wherein the set of expert rules define various software installation package parameter settings according to various characteristics of the security policy.

8. The system of claim 1, wherein the network attributes data store includes a directory service.

9. The system of claim 1, wherein the task manager module, the configurator module, and the authorization module are executed on an administration server that is remotely situated from, but communicatively coupled to, the plurality of user devices and the network attributes data store.

10. The system of claim 1, wherein user attributes from which the access privilege level information for individual users is determinable includes at least one attribute selected from the group consisting of: a title or role of the user in an organization; a configuration of the user device, attributes of a network connection between the user device and the task manager module, a list of network resources accessible to the user via the user device; an identification of an organization to which the user is assigned.

11. A method for automated configuration of a software application to be installed, via a software installation package provided over a computer network, onto a plurality of different user devices for a plurality of different users, the method comprising:
   obtaining an initial software installation package;
   obtaining information representing (a) associations between the plurality of users and the plurality of user devices, and (b) user attributes from which access privilege level information for individual users is determinable;
   configuring the initial software installation package for individual ones of the plurality of user devices based on the information representing (a) and (b), to produce a plurality of different specially-configured software installation packages, each one of which corresponds to one or more specific users and one or more specific user devices, wherein each specially-configured software installation package includes installation parameters that establish functionality for the software application based on the access privilege level of the corresponding one or more specific users;
   authenticating each user of each user device in response to an initiation of installation of the software application via execution of a corresponding specially-configured software installation package on each corresponding user device, including either permitting or preventing completion of the installation of the software application on each user device in response to a corresponding result of the authenticating, wherein the authentication of each user of each user device is a distinct authentication operation from a local authentication operation performed by each user device to authenticate an authorized user.

12. The method of claim 11, wherein obtaining information representing (a) and (b) includes communicating with a network attributes data store via the computer network.

13. The method of claim 11, wherein the functionality for the software application based on the access privilege level of the corresponding one or more specific users includes a capability to provide certain access credential information.

14. The method of claim 11, further comprising:
   obtaining information representing device attributes for each of the plurality of user devices, and producing each specially-configured software installation package such that the installation parameters establish functionality based further on device attributes corresponding to the one or more user devices.

15. The method of claim 11, further comprising:
   obtaining information representing a security policy; and
   producing each specially-configured software installation package such that the installation parameters establish functionality based further on that security policy.

16. The method of claim 15, wherein configuring the initial software installation package includes applying a set of expert rules to produce each specially-configured software installation package, wherein the set of expert rules define various software installation package parameter settings according to various characteristics of the security policy.

17. A method for automated configuration of a software application to be installed, via a software installation package provided over a computer network, onto a user device for a specific user, the method comprising:
   performing, by the user device, a local authentication of a user to either permit or prevent login of that user onto the user device;
   downloading, by the user device, a first specially-configured software installation package that is produced remotely by a service that:
      obtains an initial software installation package;
      obtains information representing (a) associations between a plurality of users and a plurality of user devices, and (b) user attributes from which access privilege level information for individual users is determinable;
      configures the initial software installation package for individual ones of the plurality of user devices based on the information representing (a) and (b), to produce a plurality of different specially-configured software installation packages, including the first specially-configured software installation package, each one of the plurality of different specially-configured software installation packages corresponding to one or more specific users and one or more specific user devices, wherein each specially-configured software installation package includes installation parameters that establish functionality for the software application based on the access privilege level of the corresponding one or more specific users; and
   downloading, by the user device, the first specially-configured software installation package;
   initiating, via execution of the first specially-configured software installation package, installation of the software application via execution of the first specially-configured software installation package by the user device;
   in response to the initiating of the installation of the software application, authenticating, by the user device, the user of the user device, including either permitting or preventing completion of installation of the software application on the user device via the first specially-configured software installation package in response to a result of the authenticating, wherein the authentication of each user of each user device is a distinct authentication operation from a local authentication operation performed by each user device to authenticate an authorized user.

* * * * *

UNITED STATES PATENT AND TRADEMARK OFFICE
CERTIFICATE OF CORRECTION

| | | |
|---|---|---|
| PATENT NO. | : 8,839,234 B1 | Page 1 of 1 |
| APPLICATION NO. | : 13/851811 | |
| DATED | : September 16, 2014 | |
| INVENTOR(S) | : Voronkov et al. | |

It is certified that error appears in the above-identified patent and that said Letters Patent is hereby corrected as shown below:

On the Title page of the patent:

After:
(22)   Filed: March 27, 2013

Please insert:

--(30)   Foreign Application Priority Data

December 25, 2012   (RU)..........................2012156447--

Signed and Sealed this
Ninth Day of June, 2015

Michelle K. Lee
*Director of the United States Patent and Trademark Office*